(12) United States Patent
Crevasse et al.

(10) Patent No.: US 6,290,883 B1
(45) Date of Patent: Sep. 18, 2001

(54) METHOD FOR MAKING POROUS CMP ARTICLE

(75) Inventors: Annette Margaret Crevasse, Apopka; William Graham Easter, Orlando; John Albert Maze, Orlando; Frank Miceli, III, Orlando, all of FL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,262

(22) Filed: Aug. 31, 1999

(51) Int. Cl.$^7$ ................................................. B29C 44/02
(52) U.S. Cl. ............................................. 264/50; 264/158
(58) Field of Search ........................................ 264/50, 158

(56) References Cited

U.S. PATENT DOCUMENTS

| | | | |
|---|---|---|---|
| 4,110,881 | * 9/1978 | Thompson | 29/91.1 |
| 4,906,672 | * 3/1990 | Stone et al. | 521/130 |
| 4,927,432 | 5/1990 | Budinger et al. | 51/298 |
| 5,120,770 | * 6/1992 | Doyle et al. | 521/99 |
| 5,124,095 | * 6/1992 | Gianni et al. | 264/50 |
| 5,489,233 | 2/1996 | Cook et al. | 451/41 |
| 5,578,362 | 11/1996 | Reinhardt et al. | 428/147 |
| 5,584,146 | 12/1996 | Shamouillan et al. | 51/293 |
| 5,604,267 | * 2/1997 | Duffy | 264/50 |
| 5,624,304 | 4/1997 | Pasch et al. | 451/287 |
| 5,798,063 | * 8/1998 | Bender et al. | 264/50 |
| 5,810,964 | 9/1998 | Shiraishi | 156/345 |
| 5,846,336 | 12/1998 | Skrovan | 134/10 |
| 5,915,175 | 6/1999 | Wise | 438/238 |
| 5,921,856 | * 7/1999 | Zimmer | 451/539 |

OTHER PUBLICATIONS

Braun, *Semiconductor International*, "Slurries and Pads Face 2001 Challenges," (11/98), pp. 1–8.

Dejule, *Semiconductor International*, "CMP Grows in Sophistication," (11/98), pp. 1–5.

Sethuraman, *Future Fab*, "CMP Past, Present and Future," pp. 1–5 (1999).

* cited by examiner

*Primary Examiner*—Allan R. Kuhns
(74) *Attorney, Agent, or Firm*—Allen, Dyer, Doppelt, Milbrath & Gilchrist, P.A.

(57) ABSTRACT

A method and apparatus for making a chemical mechanical polishing (CMP) article dissolves gas into solidifiable material, and reduces pressure on the solidifiable material to form gas bubbles therein while solidifying the solidifiable material to make a matrix with voids therein. The gas bubbles are preferably formed to define voids interconnected with adjacent voids to thereby define a porous matrix. The porous matrix ensures uniform distribution of the CMP slurry for greater polishing uniformity. The method produces a CMP pad, for example, with very uniform porosity throughout its thickness so that polishing remains uniform as the pad is consumed in use. The gas and the solidifiable material may preferably be non-reactive with one another. The gas may comprise at least one inert gas, such as nitrogen or argon, for example. The solidifiable material may be a polymer-forming liquid and at least one of a curing and cross-linking agent mixed therein. The polymer-forming liquid may comprise urethane, for example, so that the resulting matrix is polyurethane.

11 Claims, 4 Drawing Sheets

METHOD FOR MAKING POROUS CMP ARTICLE

FIELD OF THE INVENTION

The present invention relates to semiconductor processing, and, more particularly, to articles for planarizing or polishing semiconductor wafers during the manufacture of integrated circuits, and methods and apparatus for making the articles.

BACKGROUND OF THE INVENTION

Integrated circuits are used in many electronic devices. A typical integrated circuit includes a semiconductor substrate, such as formed of silicon. A number of active regions may be formed in the substrate, and a plurality of interconnect layers are formed on the substrate to interconnect the active regions and/or facilitate external connections to the active regions. Typically a plurality of integrated circuits are collectively formed on a semiconductor wafer.

It is also typically important to planarize the wafer after various process steps to remove unwanted portions or to ensure a planar upper surface for forming a next layer thereon. One common technique to planarize a wafer is known as chemical mechanical polishing (CMP). CMP is a very widely used technique which delivers a slurry of material to the wafer surface and while a polishing pad or belt is passed over the wafer surface. For example, U.S. Pat. No. 4,972,432 entitled "Pad Material for Grinding, Lapping and Polishing" discloses a polishing pad including a porous thermoplastic resin matrix, such as comprising polyurethane, reinforced with a fibrous network provided by a felted mat of polyester fibers. The polishing material is modified by coalescing the resin among the fibers, preferably by heat treatment, to increase the porosity and hardness of the material as well as increasing the surface activity of the resin. The two different resins have different melting temperatures so that one is coalesced first. The polishing material may also incorporate polishing aids, such as particulate abrasives.

Another polishing pad is disclosed in U.S. Pat. No. 5,578,362 to Reinhardt et al. This patent discloses in its background a number of different pad constructions including a so-called "minitexturized" pad which includes intermediately sized textured artifacts on the pad, which may be produced by use of lasers or the incorporation of air or gas within the pad material. Conventional pads are described as including "microtexture" which is the intrinsic microscopic bulk texture of the pad after manufacture which is largely random. "Macrotextures" are artifacts or features generally greater than about 5 mm, and spacing and sizes are typically very regular and repetitive. The patent further discloses a pad including a plurality of microelements impregnated into a polymeric matrix. The polymeric microelements at the work surface are less rigid than those embedded. Accordingly, the less rigid microelements at the work surface cause the surface of the pad to be continuously regenerated.

U.S. Pat. No. 5,584,146 to Shamouillan et al. discloses a polishing pad including a plurality of conduits passing through the entire thickness of the pad. The conduits are to hold the slurry uniformly across the surface of the polishing pad, and to permit the addition of slurry or other materials therethrough.

Rodel, Inc. of Newark, Del. makes a line of CMP pads formed from filled and/or blown urethanes such as IC-series, MH-series and LP-series polishing pads. These have a surface structure made up of semicircular depressions derived from the cross-section of exposed hollow spherical elements or incorporated gas bubbles.

Despite continuing advances in the area of pads for CMP, there still exists a need for pads having more uniform surfaces, especially as the pad wears. In addition, the purity of such pads is desirably controlled to produce more consistent polishing results.

SUMMARY OF THE INVENTION

In view of the foregoing background, it is therefore an object of the present invention to provide a method and apparatus for producing CMP pads and/or belts, which have greater uniformity, and which are readily manufactured.

These and other objects, features and advantages in accordance with the present invention are provided by a method for making a chemical mechanical polishing (CMP) article comprising a matrix with voids therein. In particular, the method preferably comprises the steps of: dissolving gas into solidifiable material, and reducing pressure on the solidifiable material to form gas bubbles therein while solidifying the solidifiable material to make the matrix with voids therein. The step of dissolving preferably comprises subjecting the solidifiable material to gas at an elevated pressure. The gas bubbles are preferably formed to define voids interconnected with adjacent voids to thereby define a porous matrix.

The porous matrix ensures uniform distribution of the CMP slurry for greater polishing uniformity. The method produces a CMP pad, for example, with very uniform porosity throughout its working thickness so that polishing remains uniform as the pad is consumed in use. Moreover, the method of using the bubbles to define the voids allows the pad to have a high purity which is also important for polishing uniformity. In other words, the matrix material is the only constituent material of the pad, unlike pads which use microcapsules of different material to form voids.

The gas and the solidifiable material may preferably be non-reactive with one another. The gas may comprise at least one inert gas, such as nitrogen or argon, for example.

In one particularly advantageous embodiment, the solidifiable material comprises a polymer-forming liquid and at least one of a curing and cross-linking agent mixed therein. The polymer-forming liquid may comprise urethane, for example, so that the resulting matrix is polyurethane. Polyurethane is a widely used material for CMP pads with excellent wear, hardness, and other characteristics. The polymer-forming liquid and the curing or cross-linking agent can be combined just prior to the step of dissolving the gas.

The solidifiable material may be retained in a mold during the processing steps explained above. The method may also include the step of shaping the solidified material to have at least one planar major surface. The solidified material is typically formed into at least one generally-disk shaped body for use as a CMP pad. An elongate version can be shaped for a CMP belt.

Another aspect of the invention is directed to an apparatus for making the CMP article comprising the matrix with voids therein. The apparatus preferably includes a mold containing solidifiable material, a gas source, and a pressure chamber receiving the mold therein and connected to the gas source. In addition, the apparatus also preferably includes a pressure controller associated with the pressure chamber for controlling a pressure therein for dissolving gas into the solidifiable material, and reducing pressure on the solidifiable material to form gas bubbles therein while the solidifiable material solidifies to make the matrix with voids therein.

The pressure controller preferably subjects the solidifiable material to gas at an elevated pressure to dissolve the gas. In addition, the pressure controller preferably causes the gas bubbles to form to define voids interconnected with adjacent voids to define a porous matrix. The gas and the solidifiable material are preferably non-reactive with one another in one embodiment, again to ensure the purity of the finished CMP article. The solidifiable material may comprise a polymer-forming liquid and at least one of a curing and cross-linking agent mixed therein.

The apparatus may also comprise respective dispensers for the polymer-forming liquid and the at least one of a curing and cross-linking agent. The dispensers may dispense the materials into the mold prior to positioning into the chamber. The apparatus may also include a heater associated with the chamber, and a heater controller connected to the heater.

The apparatus may also include a shaping station downstream from the chamber for shaping the solidified material to have at least one planar major surface. The shaping station preferably shapes the solidified material into a plurality of generally-disk shaped bodies, for use as CMP pads. Alternately, the solidified material may be shaped into belt form for CMP belts.

Another aspect of the invention relates to the CMP article produced in accordance with the invention. The CMP article includes a body having at least one substantially planar contacting surface for applying a slurry to a semiconductor wafer for CMP thereof. The body preferably comprises a matrix with voids therein. The matrix, in turn, preferably comprises a homogenous solidified polymer. The voids may be generally spherically shaped with at least some of the voids being interconnected with adjacent voids so that at least the contacting surface is porous. In other embodiments, an entire thickness of the body may be porous. The body may have a substantially uniform thickness. The homogenous solidified polymer may be polyurethane. The body may have a disk shape for a CMP pad.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. The dimensions of layers and regions may be exaggerated in the figures for greater clarity.

Figure 1:
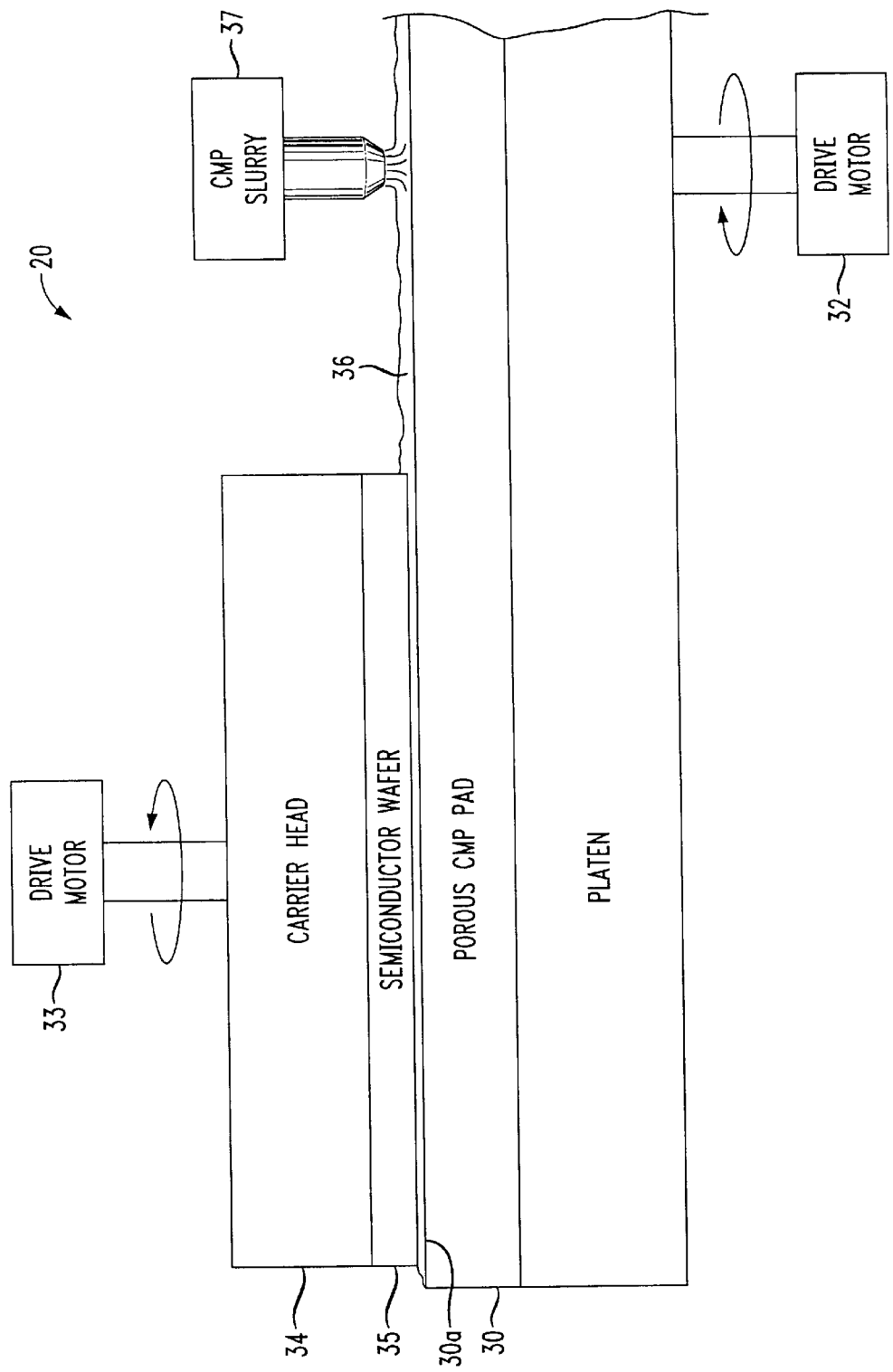
FIG. 1 is a schematic diagram of chemical mechanical polishing (CMP) machine using the CMP pad in accordance with the present invention.
Figure 2:
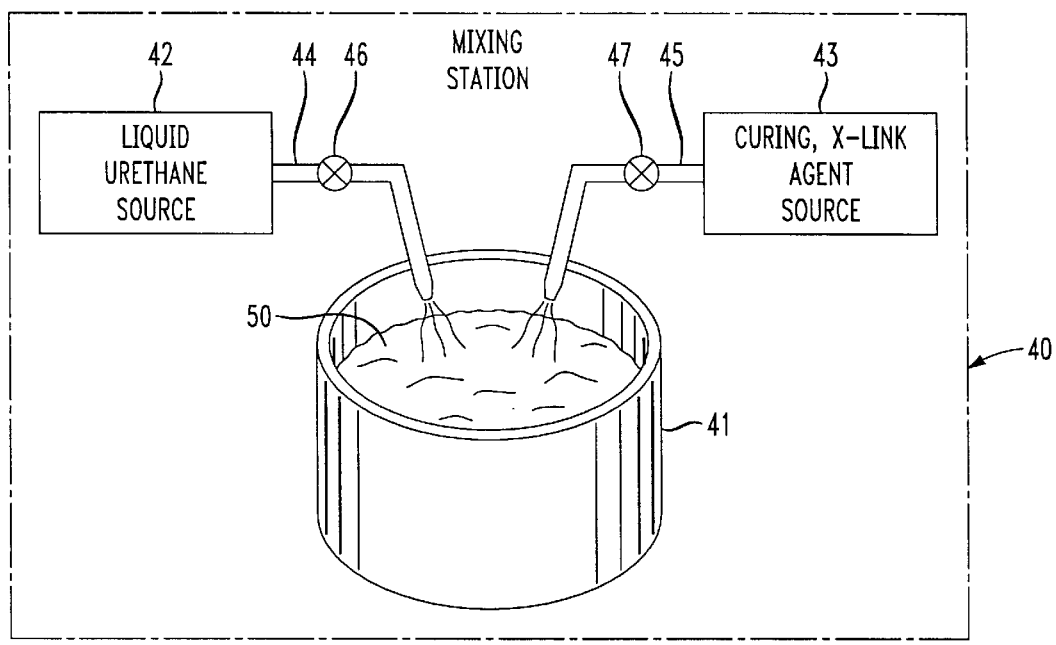
FIG. 2 is a schematic diagram of a mixing station of an apparatus for making the CMP pad as used in the machine of FIG. 1.

Referring initially to FIG. 1, the use of the CMP pad 30 in accordance with the invention is described. The CMP pad 30 is positioned on a supporting platen 31, which, in turn, is rotated by a first drive motor 32 of the CMP machine 20. A second drive motor 33 rotates a carrier head 34 which, in turn, supports the semiconductor wafer 35 against the CMP pad 30. As will be readily understood by those skilled in the art, CMP slurry 36 is dispensed from the CMP source 37. As will also be appreciated by those skilled in the art, the surface of the semiconductor wafer 45 is planarized by the combined mechanical and chemical action at the wafer surface.

The CMP process can be used to planarize dielectric layers, such as oxide layers. Metals layers, or layers including both metals and oxides may also be planarized using the CMP pad 30 in the CMP machine 20 as will be appreciated by those skilled in the art. The specifics of the CMP process need no further description herein. However, it will be apparent to those skilled in the art, that uniformity of planarization is a desired goal of the CMP process, and the CMP pad 30 plays a very significant role in ensuring uniformity.

Referring now additionally to FIGS. 2–6, the apparatus and method for making the CMP pad 30 in accordance with the present invention are now described. From the start (Block 60), a polymer-forming liquid, such as liquid urethane is mixed with a curing and/or cross-linking agent at Block 62. This mixing may be carried out in the mold 41, such as in the schematically illustrated mixing station 40 of FIG. 2. The mixing station 40 also includes sources for the liquid urethane and curing/cross-linking agent 42, 43, respectively. The liquid urethane is delivered through the schematically illustrated conduit 44 and is controlled by a valve 46. Similarly, the curing and/or cross-linking agent is delivered from its source 43 through conduit 45, and the flow is controlled by the valve 47. The sources, conduits, and control valves provide dispensers for the respective materials. The thus produced mass of solidifiable material within the mold 41 is generally designated by reference numeral 50.

Polyurethane is a widely used material for CMP pads with excellent wear, hardness, and other characteristics. The polymer-forming liquid and the curing or cross-linking agent can be combined just prior to the step of dissolving the gas. As disclosed in U.S. Pat. No. 5,578,362, for example, a urethane polymer may be formed from a polyether-based liquid urethane, such as the ADIPRENE line of products which are available from Uniroyal Chemical Co., Inc. of Middlebury, Conn. The liquid urethane is preferably one which reacts with a polyfunctional amine, diamine, triamine or polyfunctional hydroxyl compound or mixed functionality compounds such as hydroxyl/amines dwelling in the urethane/urea cross-linked networks to permit the formation of urea links and a cure/cross-linked polymer network. The liquid urethane may be reacted with the commercially available product CURENE 442 from Anderson Development Co. of Adrian, Mich. Of course, those of skill in the art will recognize that other materials may be used as well. For example, the resulting polymeric matrix may be formed from urethanes, melamines, polyesters, polysulfones, polyvinyl acetates, fluorinated hydrocarbons, and the like and mixtures, coploymers and grafts thereof.

Figure 3:
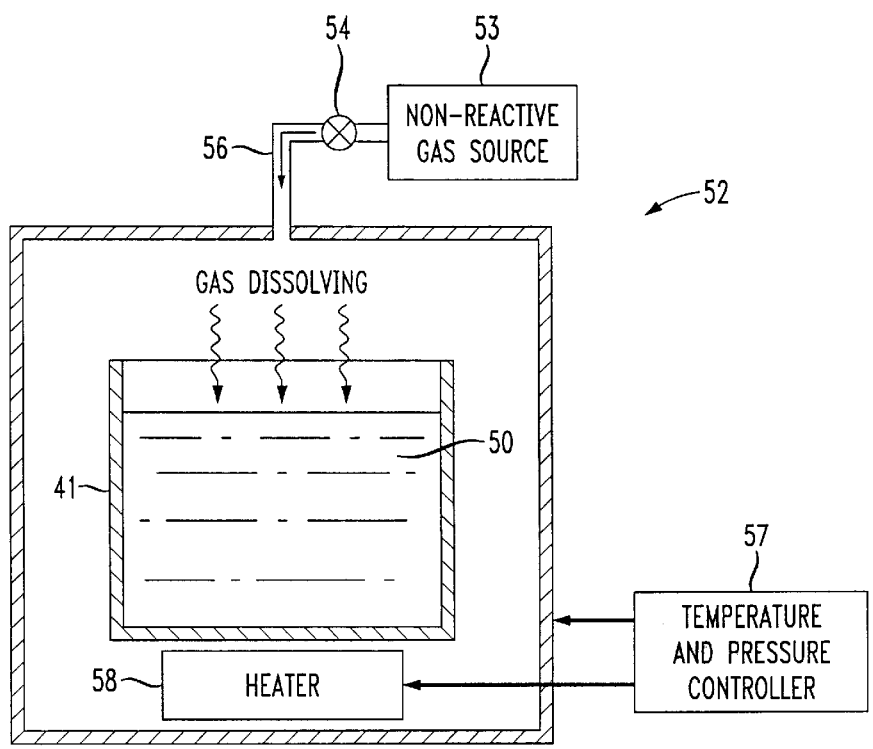
FIG. 3 is a schematic cross-sectional view of a pressure chamber portion of an apparatus for making the CMP as used in the machine of FIG. 1.

The mold 41 containing the mass of solidifiable material 50 is positioned in a pressure and temperature controlled chamber 52 as schematically illustrated in FIG. 3. Coupled to the chamber 52 via the control valve 54 and conduit 56 is a non-reactive gas source 53. The gas from the source 53 is dissolved into the solidifiable material 50 at Block 64 typically at an elevated pressure. The pressure may be controlled, as well as the temperature, by the schematically illustrated temperature and pressure controller 57 as will be readily appreciated by those skilled in the art. A heater 58 may be provided in the chamber 52 or outside the chamber to set a predetermined temperature to assist in the dissolving the gas, and/or to control the temperature during curing of the solidifiable material 50 as will also be appreciated by those skilled in the art.

At Block 66 the pressure is reduced within the chamber 52 to reduce the pressure on the solidifiable material 50 and therefore form gas bubbles therein. Heat may be added during the pressure reducing step, depending on the particular polymer chemistry employed, to thereby help solidify the solidifiable material 50 to make the matrix with voids therein (Block 68).

Figure 4:
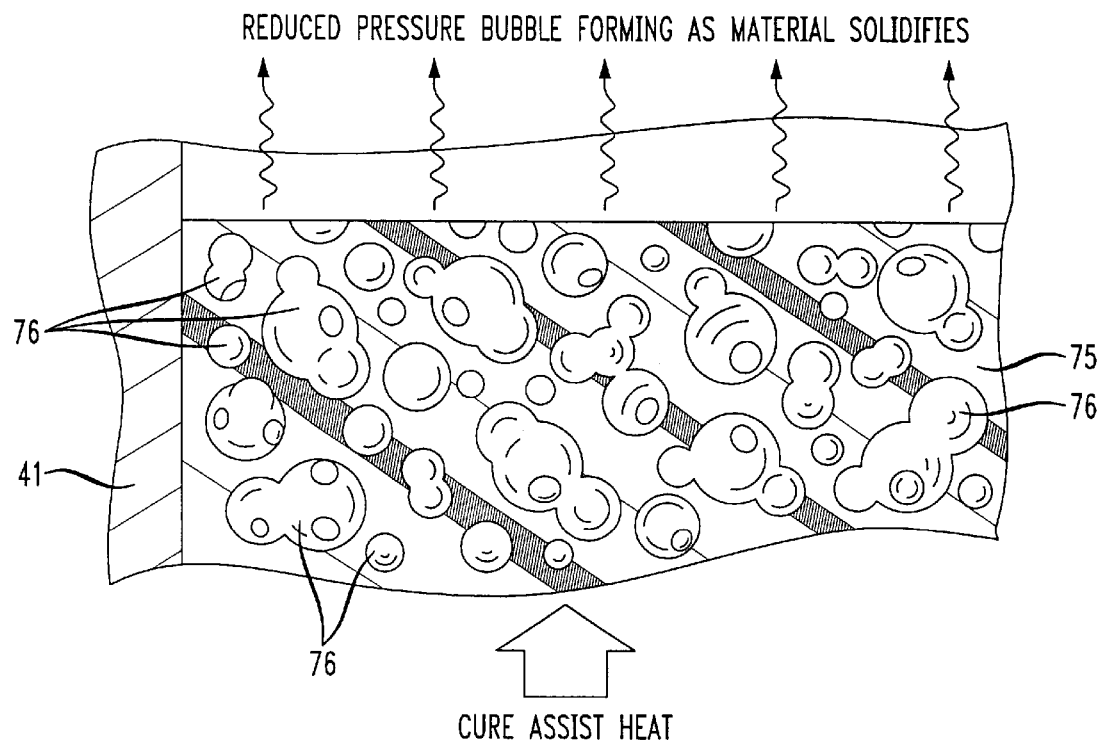
FIG. 4 is a greatly enlarged schematic cross-sectional view of a portion of the mold and solidified material during the method of making the CMP pad as used in the machine of FIG. 1.
Figure 5:
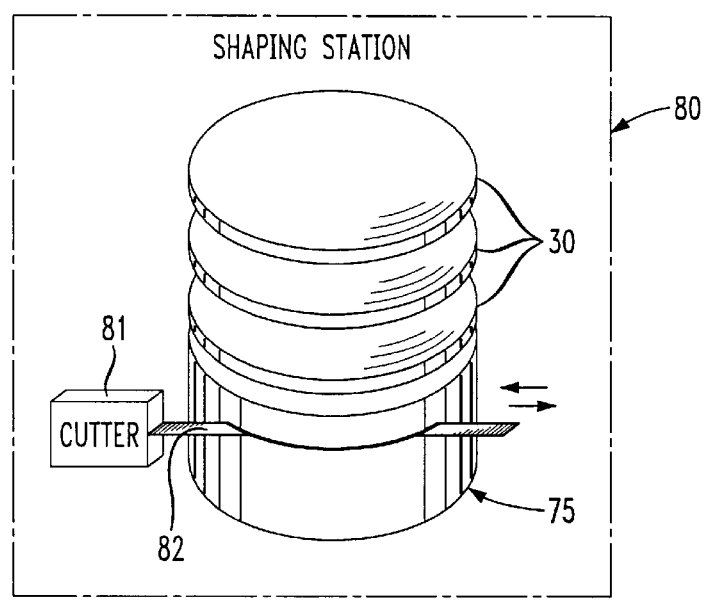
FIG. 5 is a schematic view of a shaping station portion of the apparatus for making the CMP pad as used in the machine of FIG. 1.
Figure 6:
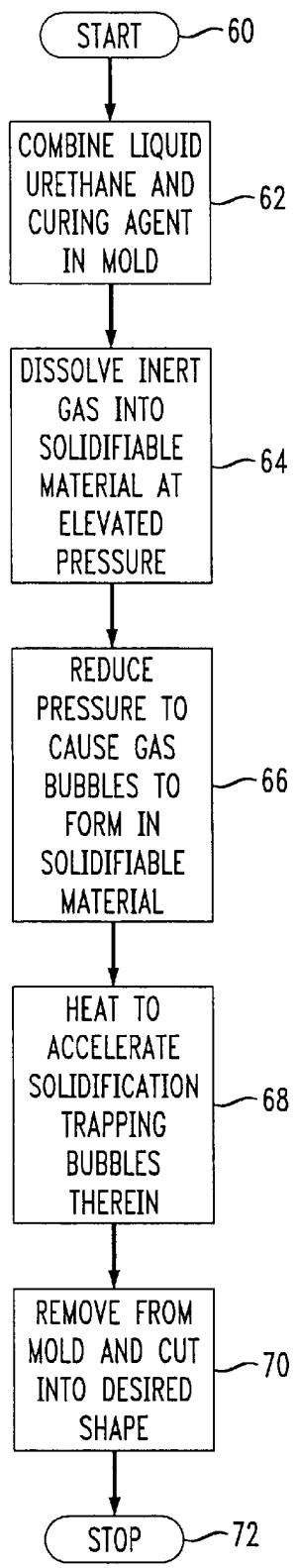
FIG. 6 is a flowchart for the method of making the CMP pad as used in the machine of FIG. 1.

The formation of gas bubbles and solidification are perhaps best understood with reference to the enlarged schematic cross-sectional view of the FIG. 4. In this figure, the mass of solidifiable material has been solidified into a matrix 75 with voids 76 therein. The formation of the bubbles in accordance with the invention is very similar to decompression sickness among scuba divers, wherein nitrogen is dissolved into the blood and tissue at depth. If the diver ascends too quickly, the nitrogen may be released within the body forming nitrogen bubbles.

In accordance with the invention, it is desirable to control the pressure reduction and solidification so as to form a desired quantity and size of bubbles, which define the voids 76 within the matrix 75. As illustrated in FIG. 4, the gas bubbles may be generated to define voids 76 interconnected with adjacent voids to thereby define a porous matrix 75. The porous matrix 75 ensures uniform distribution of the CMP slurry 36 for greater polishing uniformity as will be readily appreciated by those skilled in the art.

The porosity of the CMP pad 30 of the present invention is in contrast to the prior art CMP pads which include microcapsules to define voids within a matrix. The microcapsules are intact and prevent the matrix from being porous as in the present invention. In other words, the polyurethane matrix material of the invention is the only constituent material of the pad, unlike the polyurethane pads which use the microcapsules of different material. Because the pressure and temperature can be relatively precisely controlled in accordance with the invention, the bubbles may formed to have generally spherical shapes, to have sizes within desired ranges, and a predetermined density within the matrix 75. In addition, since the gas may be an inert gas, such as nitrogen or argon, for example, the purity of the matrix 75 can be precisely controlled. The gas from the source 53 and the solidifiable material 50 may preferably be non-reactive with one another. The method produces a CMP pad 30, for example, with very uniform porosity throughout its working thickness so that polishing remains uniform as the pad is consumed in use.

At Block 70, the solidified matrix 75 is removed from the mold and shaped at the schematically illustrated shaping station 80 (FIG. 5) to have at least one planar major surface. More particularly, as shown in the illustrated embodiment the solidified matrix 75 may be cut into generally disk-shaped pads 30 by a cutter 81 having a cutting blade 82. The method stops at Block 72, although those skilled in the art will appreciate that other shaping and/or finishing steps may also be desirable for the CMP pad 30.

Those of skill in the art will recognize that the mixing station 40, pressure chamber 52, and shaping station 80 can be discrete portions of an apparatus, of can be combined together in other embodiments.

In other embodiments, only a single pad 30 may be molded at one time, although forming the relatively large size matrix 75 may offer economies and processing advantages as will be appreciated by those skilled in the art. In addition, although the description has been directed to forming a disk-shaped CMP pad 30, an elongate version can be formed and/or shaped for a CMP belt, as will also be appreciated by those skilled in the art.

The CMP pad 30 or article produced in accordance with the invention includes a body having at least one substantially planar contacting surface 30a for applying the slurry 36 to a semiconductor wafer 35 for CMP thereof (FIG. 1). The body preferably comprises a matrix 75 with voids 76 therein (FIG. 4). The matrix 75, in turn, preferably comprises a homogenous solidified polymer, such as formed of polyurethane. The voids 76 may be generally spherically shaped with at least some of the voids being interconnected with adjacent voids so that at least the contacting surface 30a is porous. In other embodiments, an entire thickness of the body may be porous. The body may have also substantially uniform thickness. The body may have a disk shape for a CMP pad or be elongate for a CMP belt. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for making a chemical mechanical polishing (CMP) article comprising a matrix with voids therein, the method comprising:

retaining solidifiable material in a mold;

dissolving gas into the solidifiable material within the mold at an elevated pressure;

reducing pressure on the solidifiable material to form gas bubbles therein while solidifying the solidifiable material within the mold to make a matrix with voids therein; and shaping the solidified material to make at least one CMP article having a working surface with voids exposed thereon.

2. A method according to claim 1 wherein the gas bubbles are formed to define voids interconnected with adjacent voids to define a porous matrix.

3. A method according to claim 1 wherein the gas and the solidifiable material are non-reactive with one another.

4. A method according to claim 1 wherein the gas comprises at least one inert gas.

5. A method according to claim 4 wherein the at least one inert gas comprises at least one of argon and nitrogen.

6. A method according to claim 1 wherein the solidifiable material comprises a polymer-forming liquid and at least one of a curing and cross-linking agent mixed therein.

7. A method according to claim 6 wherein the polymer-forming liquid comprises urethane.

8. A method according to claim 6 wherein the polymer-forming liquid and the at least one of a curing and cross-linking agent are combined just prior to the step of dissolving.

9. A method according to claim 6 wherein the solidified material comprises polyurethane.

10. A method according to claim 6 further comprising the step of shaping the solidified material to have at least one planar major surface.

11. A method according to claim 6 wherein the step of shaping comprises shaping the solidified material into at least one generally-disk shaped body.

* * * * *